United States Patent
McGinnis

(10) Patent No.: US 6,809,050 B1
(45) Date of Patent: Oct. 26, 2004

(54) HIGH TEMPERATURE GLASS FIBERS

(75) Inventor: Peter B. McGinnis, Gahanna, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/703,234

(22) Filed: Oct. 31, 2000

(51) Int. Cl.$^7$ .................... C03C 13/00; C03C 13/06
(52) U.S. Cl. ............................... 501/35; 501/36
(58) Field of Search ......................... 501/35, 36

(56) References Cited

U.S. PATENT DOCUMENTS

| | | | |
|---|---|---|---|
| 3,402,055 A | | 9/1968 | Harris et al. |
| 3,498,805 A | | 3/1970 | Stalego |
| 4,199,364 A | * | 4/1980 | Neely ................. 501/35 |
| 4,569,471 A | | 2/1986 | Ingemansson et al. |
| 4,582,748 A | * | 4/1986 | Eastes et al. ............ 501/35 |
| 5,248,637 A | | 9/1993 | Taneda et al. |
| 5,569,629 A | | 10/1996 | TenEyck et al. |
| 5,585,312 A | | 12/1996 | TenEyck et al. |
| 5,789,329 A | * | 8/1998 | Eastes et al. ............ 501/36 |
| 5,962,354 A | * | 10/1999 | Fyles et al. ............. 501/36 |
| 6,069,100 A | * | 5/2000 | Naumann et al. ......... 501/67 |
| 6,136,735 A | * | 10/2000 | Gallo et al. ............. 501/36 |
| 6,156,683 A | * | 12/2000 | Grove-Rasmussen et al. 501/35 |
| 6,169,047 B1 | * | 1/2001 | Nishizawa et al. ........ 501/66 |
| 6,329,310 B1 | * | 12/2001 | Peuchert et al. .......... 501/66 |
| 6,358,873 B1 | * | 3/2002 | Stewart ................. 501/64 |

FOREIGN PATENT DOCUMENTS

| | | |
|---|---|---|
| FR | 1 435 073 | 4/1966 |
| FR | 2 223 328 | 10/1974 |
| FR | 2692248 | * 12/1993 |
| JP | 58 064243 | 4/1983 |

* cited by examiner

*Primary Examiner*—Karl Group
(74) *Attorney, Agent, or Firm*—Inger H. Eckert; Maria C. Gasaway

(57) ABSTRACT

High temperature glass fibers suitable for use as textile and reinforcements are specifically adapted to be used in high temperature applications such as sound absorbing material in engine exhaust mufflers. The glass fibers have compositions of up to 72 Mole % $SiO_2$, 20 mole percent $Al_2O_3$, 22 mole percent alkaline earth oxides and may include small amounts of alkali oxides and $ZrO_2$.

9 Claims, 4 Drawing Sheets

Figure #1
S-Glass Heat-Treated at 903°C for 8 Hours
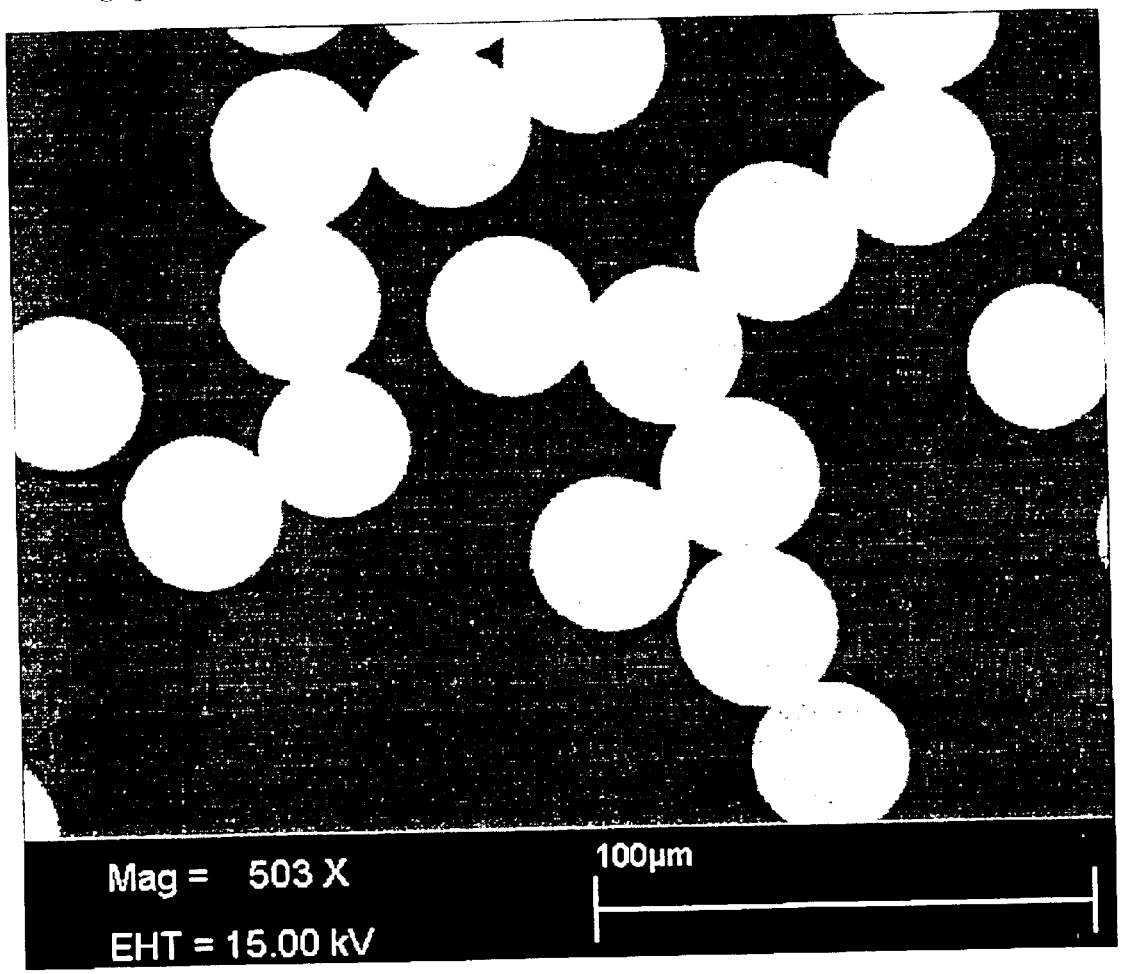

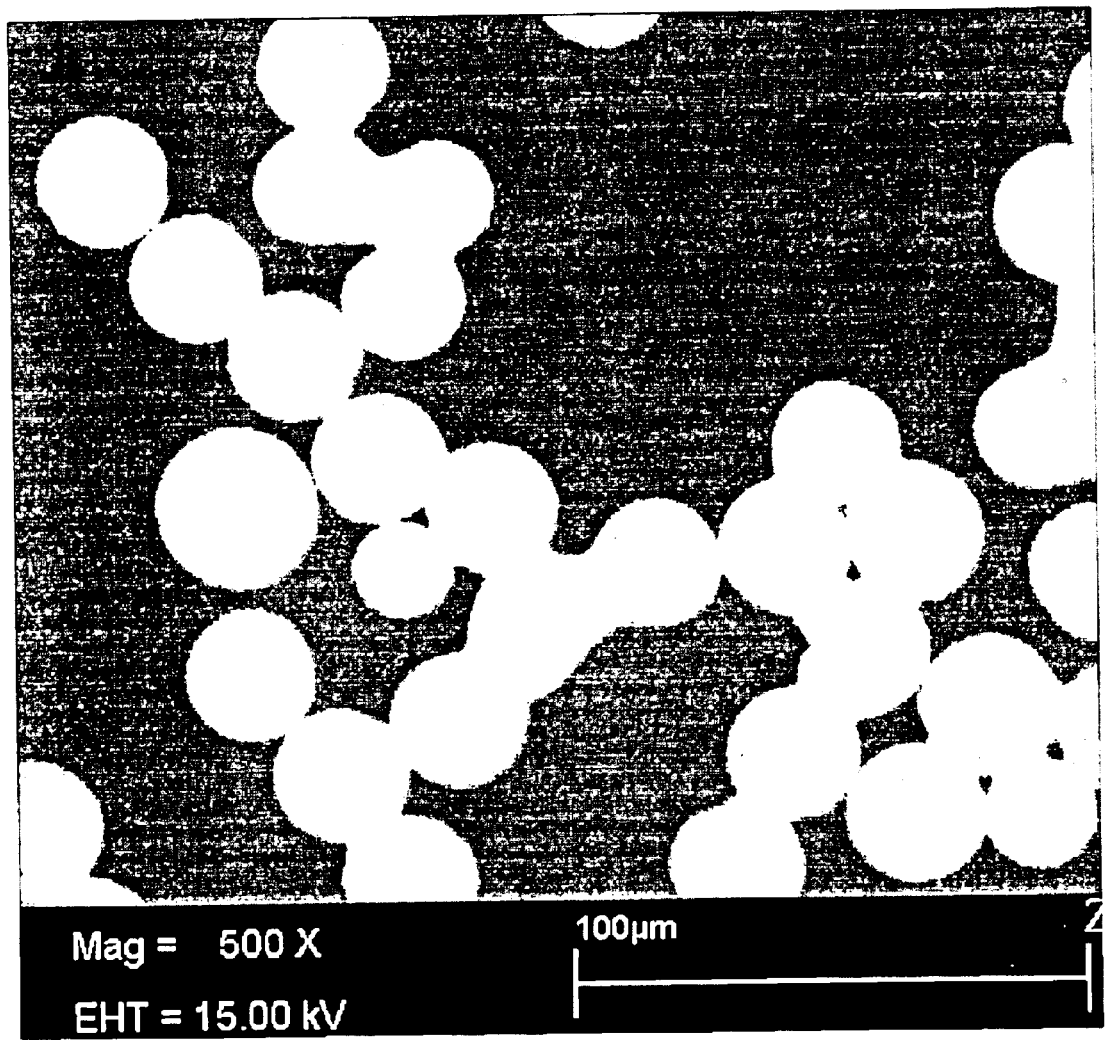
Figure #2
S-Glass Heat-Treated at 921°C for 8 hours

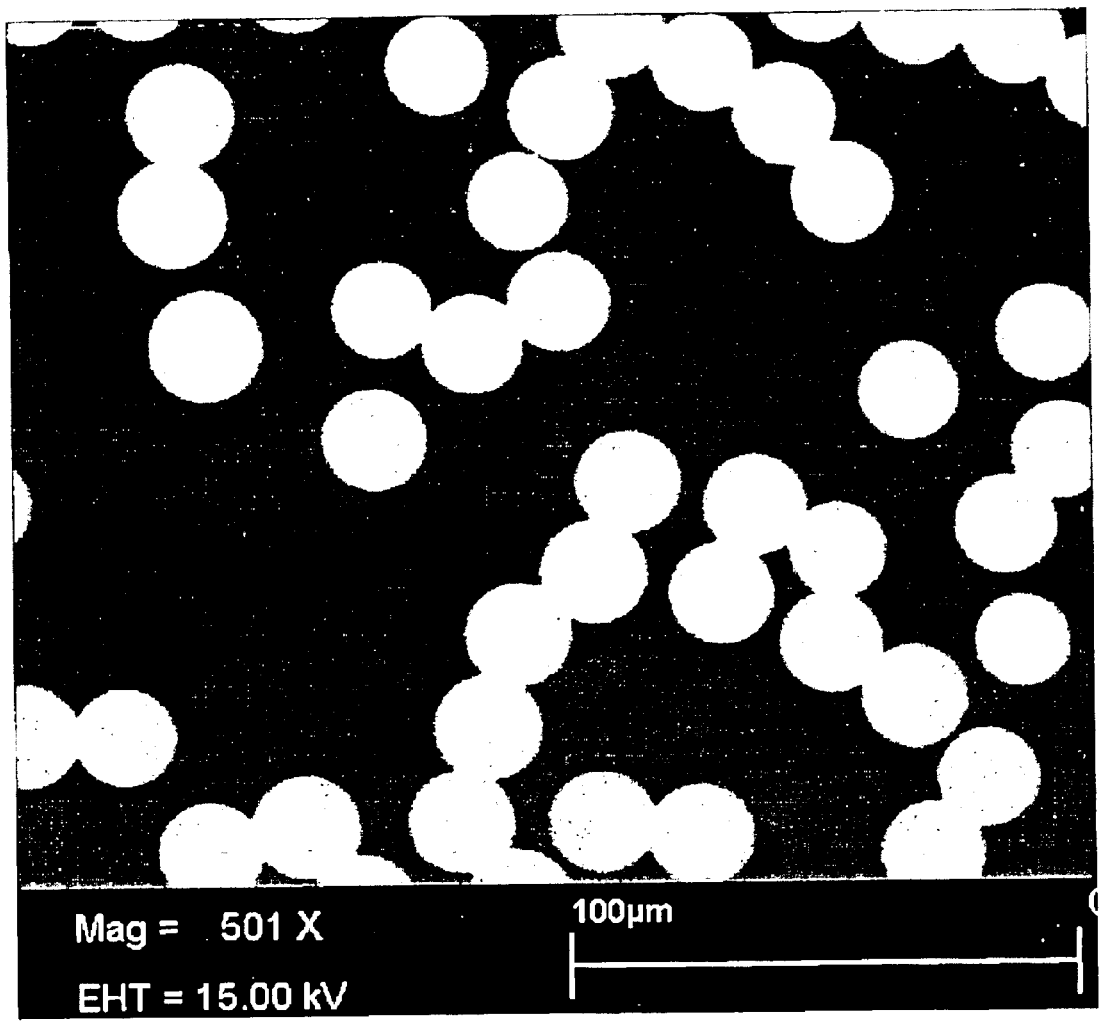
Figure #3
Glass #110 Heat-Treated at 921°C for 8 Hours

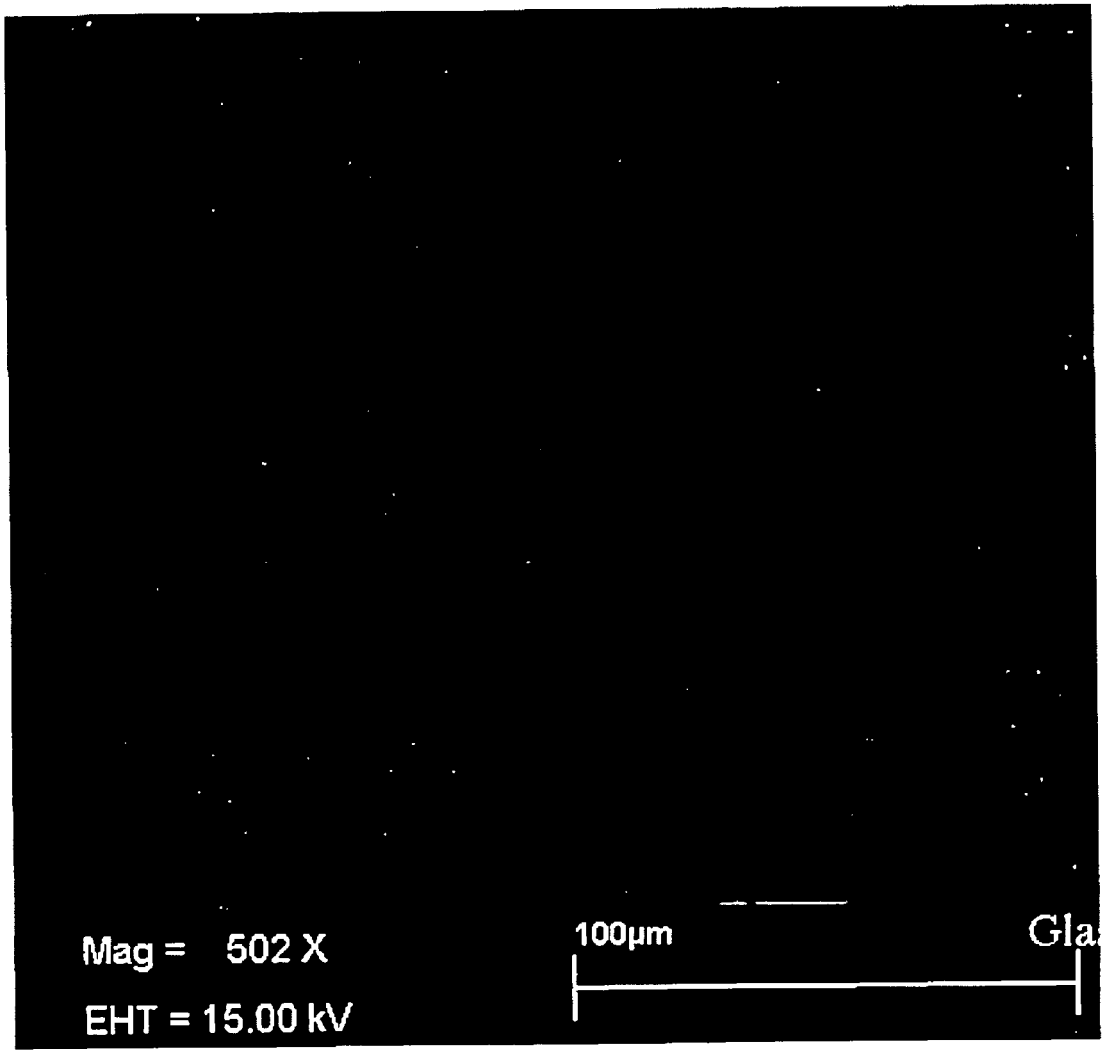
Figure #4
Glass #96 Heat Treated at 921°C for 8 hours

HIGH TEMPERATURE GLASS FIBERS

FIELD OF THE INVENTION

The present invention is generally directed to continuous glass fibers for use in high temperature applications.

BACKGROUND OF INVENTION

The use of continuous glass fibers in high temperature environments for acoustical and thermal insulating applications can be in the form of wound strands, packed fiber, or texturized strands. Texturization is accomplished by injecting the strands into cavities through a nozzle with compressed air. This process fluffs-up the strands and creates a fiber pack that is much lighter in density. However, applications that require these insulating characteristics at temperatures greater than 850° C. are limited in terms of the glass composition that can withstand the high temperature environment. An example of a texturized continuous glass fiber product is the use of E-glass and Advantex® glass fiber in mufflers. Texturization produces a fluffy fiber pack that is a better insulator, both thermally and acoustically. Advantex is a registered trademark of Owens Corning for boron-free glass fibers.

Filling mufflers with one or more lengths of fiberglass wool is disclosed by U.S. Pat. No. 4,569,471 to ingemansson. The fiberglass wool is inserted into a space in a container by feeding a multifilament fiberglass thread into one end of a nozzle and advancing the thread through the nozzle with the aid of compressed air which is blown into the nozzle to cause the fibers of the thread to separate and become entangled, so that the thread emerges from the other end of the nozzle as a continuous length of fiberglass wool, which is blown by the effect of the compressed air through an opening into the container space at the same time as air is evacuated from the space.

The standard glass composition for making continuous glass fiber strands is "E" glass. E glass, is the most common glass for making textile and reinforcement glass fibers. One advantage of E glass is that its liquidus temperature is approximately 200° F. (93° C.) below its forming temperature, the temperature at which the viscosity of the glass is customarily near 1000 poise. E glass melts and refines at relatively low temperatures and has a workable viscosity over a wide range of relatively low temperatures, a low liquidus temperature range, and a low devitrification rate. E glass compositions allow operating temperatures for producing glass fibers around 1900° F. to 2400° F. (1038° C. to 1316° C.) where the liquidus temperature is approximately 2100° F. (1149° C.) or lower. The ASTM classification for E-glass fiber yarns used in printed circuit boards and aerospace applications defines the composition to be 52 to 56 weight % $SiO_2$; 16 to 25 weight % CaO; 12 to 16 weight % $Al_2O_3$; 5 to 10 weight % $B_2O_3$; 0 to 5 weight % MgO; 0 to 2 weight % $Na_2O$ and $K_2O$; 0 to 0.8 weight % $TiO_2$; 0.05 to 0.4 weight % $Fe_2O_3$; 0 to 1.0 weight % Fluoride.

However, E-glass fiber containing 5 to 10 weight percent $B_2O_3$ is limited to temperatures less than 680–690° C. since it will "sinter" at higher temperatures. Sintering is defined as the coalescence of filaments at contact points through viscous flow. Viscous flow typically occurs at temperatures greater than the annealing point. The annealing point of a glass is defined as the temperature corresponding to a viscosity of $10^{13}$ Poise. When filaments coalesce, the insulating ability of the fiber pack is reduced. In addition, a texturized fiber pack becomes brittle after sintering and can break into fiber fragments when stressed.

Boron free E-Glass fibers sold under the trademark Advantex® and disclosed in U.S. Pat. No. 5,789,329 offer a significant improvement in operating temperature over boron containing E-glass. Advantex® glass fiber fits the ASTM definition for E-glass fiber used in general use applications which is 52 to 62 weight % $SiO_2$; 16 to 25 weight %CaO; 12 to 16 weight % $Al_2O_3$; 0 to 10 weight % $B_2O_3$; 0 to 5 weight % MgO; 0 to 2 weight % $Na_2O$ and $K_2O$; 0 to 1.5 weight % $TiO_2$; 0.05 to 0.8 weight % $Fe_2O_3$; 0 to 1.0 weight % Fluoride. However, Advantex® glass fiber begins to sinter at temperatures greater than 740–750° C.

Other than fused silica, S-glass is the only commercially available continuous glass fiber that can operate at temperatures greater than 850° C. S-Glass is a family of glasses composed primarily of the oxides of magnesium, aluminum, and silicon with a certified chemical composition which conforms to an applicable material specification and which produces high mechanical strength. S-Glass has a composition of approximately 65 weight % $SiO_2$; 25 weight % $Al_2O_3$; 10 weight % MgO. S-glass has a glass composition that was originally designed to be used in high strength applications such as ballistic armor. Therefore, even though S-glass can perform at high temperatures (up to 900° C. for short periods of time), it is not the optimal composition for a high temperature insulating glass fiber.

It has been determined that failure of the texturized fiber pack occurs at temperatures exceeding the annealing point ($10^{13}$ Poise). A close approximation to the annealing point is the glass transition temperature, or $T_g$. Since the annealing point of most of the glasses presented in this invention are greater than what can be measured by most commercially available tests, $T_g$ was used as a means of determining the upper use temperature of the fiber.

Both E-glass and Advantex® experience significant sintering at temperatures greater than the annealing point. S-glass, however, resists sintering at temperatures above the annealing point due to phase separation. S-glass fibers are formed by cooling very rapidly from the molten state into a solid, homogeneous glass. The rapid cooling during fiber forming does not allow the glass sufficient time to phase separate during the cooling period. Upon reheating, S-glass will phase separate from a homogeneous glass into 2 separate glasses with different compositions in the temperature range between the glass transition temperature ($T_g$ and the miscibility limit. The glass transition temperature is approximately 820° C. for S-glass, whereas the miscibility limit is not known. The phase separation of S-glass is a slow process that results in a 2 phase glass including a continuous $SiO_2$ rich phase that has a greater viscosity than the original homogeneous glass and an $SiO_2$ poor phase which has a lower viscosity. The overall viscosity of the fiber is determined by the morphology and composition of the $SiO_2$ rich, high viscosity phase. The higher effective viscosity of the phase-separated glass allows the fiber to operate at greater temperatures than a homogeneous fiber. Phase separation in S-glass is a slow process and some viscous flow occurs prior to the development of the continuous high viscosity phase, which can result in reduced albeit acceptable performance.

SUMMARY OF THE INVENTION

The invention, in part, is a glass composition suitable for the formation of continuous glass fiber that is suitable for use in high temperature applications. The composition of the present invention may be inexpensively formed into glass fiber using low cost direct melting technology because of a relatively low forming viscosity and once formed into fibers resists softening and annealing because of a relatively high glass transition temperature. The composition of the present invention is more appropriately expressed in terms of mole percent rather than weight percent due to the dramatically different atomic weights of the alkaline earth oxides. The composition of the present invention is 60–72 mole percent $SiO_2$, 10–20 mole percent $Al_2O_3$, 14.0 to 22.0 mole percent RO where RO equals the sum of MgO, CaO, SrO and BaO, 0 to 5 mole percent $ZrO_2$, and 0 to 3 mole percent alkali. In a preferred embodiment the glass composition is substantially 61-68 mole percent $SiO_2$, 15–19 mole percent $Al_2O_3$, 15–20 mole percent alkaline earth oxide, 0 to 3 mole percent $ZrO_2$, and 0 to 3 mole percent alkali metal oxide. The composition may also contain not more than about 4 mole percent of at least one oxide or halogen selected from the group consisting of ZnO, $SO_2$, $F_2$, $B_2O_3$, $TiO_2$ and $Fe_2O_3$.

The desired properties of the present invention are: a viscosity of 1000 poise at a forming temperature of from 2500° F. (1371° C.) to 2750° F. (1510° C.), a liquidus temperature at least 50° F. (28° C.) below the forming temperature, and a glass transition temperature greater than 1517° F. (825° C.). The glass transition point ($T_g$) is a measure of a low temperature viscosity and the forming viscosity is a high temperature viscosity. One would expect these viscosities to be related. However, the glasses of the present invention have reduced forming viscosities and increased glass transition temperatures as compared with S-glass. This greater temperature dependence of the glass viscosity allows for inexpensive forming of fibers which exhibit good high temperature characteristics such as increased resistance to fiber-to-fiber coalescence and slumping of a fiber pack formed of the inventive compositions.

BRIEF DESCRIPTION OF THE DRAWING

The present invention will become more fully understood from the detailed description of the invention and the accompanying drawings which are given by way of illustration only and thus do not limit the present invention.

Glasses of the present invention were tested against S-glass by isothermally heat treating fiber bundles for 8 hours at different temperatures. The fiber bundles were mounted in epoxy after heat treatment and the cross-sections were analyzed using a scanning electron microscope (SEM) in backscatter mode to determine the extent of fiber coalescence.

FIG. 1 is a scanning electron micrograph showing S-Glass heat-treated at 903° C. for 8 hours.

FIG. 2 is a scanning electron micrograph showing S-Glass heat-treated at 921° C. for 8 hours.

FIG. 3 is a scanning electron micrograph showing Glass #110 heat-treated at 921° C. for 8 hours.

FIG. 4 is a scanning electron micrograph showing Glass #96 heat-treated at 921° C. for 8 hours.

DETAILED DESCRIPTION OF THE INVENTION

The fiberizing properties of interest include the fiberizing temperature and the liquidus. The fiberizing temperature is defined as the temperature corresponding to a viscosity of 1000 Poise (log 3.0 viscosity). Lowering the fiberizing temperature can reduce the production cost since it allows for a longer bushing life, increased throughput, and reduced energy usage. By lowering the log 3.0 viscosity, a bushing operates at a cooler temperature and therefore does not "sag" as quickly. Sag occurs in bushings held at an elevated temperature for extended periods. By lowering the log 3.0 temperature, the sag rate is reduced and the bushing life can be increased. In addition, a lower log 3.0 allows for a higher throughput since more glass can be melted in a given period of time and thus the production cost is also reduced.

The liquidus is the greatest temperature at which devitrification can occur upon cooling the glass melt. At all temperatures above the liquidus, the glass is completely molten.

The final fiberizing property is referred to as "delta-T" which is simply the difference between the log 3.0 temperature and the liquidus. A larger delta-T offers a greater degree of flexibility during fiberizing and helps avoid devitrification. Devitrification is the formation of crystals within the melt. Increasing the delta-T also reduces the production cost by allowing for a greater bushing life and less sensitive forming process.

The glasses of the present invention were melted in platinum/rhodium crucibles using reagent grade raw materials. Starting batch ingredients include $SiO_2$, $Al_2O_3$, as well as chain modifiers from the source materials $MgO_3$, $CaCO_3$, $SrCO3$, $BaCO_3$, $ZrO_2$, and $Na_2CO_3$. The glasses were melted at 3000° C. for 6 hours and were stirred every 2 hours to insure compositional homogeneity.

The glass transition temperature in this invention was measured using a differential thermal analyzer, DTA. The forming viscosity in this invention was measured using a rotating spindle viscometer. The forming viscosity is defined as 1000 Poise. The liquidus in this invention was measured by placing a platinum container filled with glass in a thermal gradient furnace for 16 hours. The greatest temperature at which crystals were present was considered the liquidus temperature.

To achieve a lower log 3.0 temperature and a higher annealing point temperature ($T_g$) the $CaO-A_2O_3-SiO_2$ family of glasses was selected as a starting point based on the high $T_g$'s and relatively low cost raw materials. The compositions lying along the phase boundary line that connects 2 eutectic compositions were melted and tested. These glasses are numbers 1, 2, 3, and 8. Since these glasses lie on the phase boundary line they have a low liquidus and a large delta-T. The glass transition temperatures ($T_g$) of these glasses were measured to range between 794° F. for glass #1 and 859° C. for glass #3.

TABLE 1

|  | #1 | #2 | #8 | #3 |
|---|---|---|---|---|
| Wt % |  |  |  |  |
| SiO2 | 62 | 65 | 66.5 | 68 |
| Al2O3 | 15 | 16.875 | 17.81 | 18.75 |
| CaO | 23 | 18.125 | 15.69 | 13.25 |
| Total | 100 | 100 | 100 | 100 |
| Mol % |  |  |  |  |
| SiO2 | 64.93 | 68.88 | 70.89 | 72.92 |
| Al2O3 | 9.26 | 10.54 | 11.19 | 11.85 |
| CaO | 25.81 | 20.58 | 17.92 | 15.23 |
| Total | 100 | 100 | 100 | 100 |
| Mole % RO | 25.81 | 20.58 | 17.92 | 15.23 |
| Log 3.0 | 2431 | 2586 | 2722 | 2791 |
| Liquidus | 2232 | 2397 | 2471 | 2527 |
| Delta-T | 200 | 189 | 251 | 265 |
| Tg | 794 | 813 | 837 | 859 |

Because #3 has such a high log 3.0 viscosity, a direct weight percent substitution of $Al_2O_3$ for $SiO_2$ was made in glasses #9, #10, #55, #77, and #81. The $Al_2O_3$ for $SiO_2$ substitution was used to lower log 3.0 while maintaining $T_g$. However, this substitution raises the liquidus which quickly shrinks the delta-T since it also lowers the forming viscosity.

TABLE 2

|  | #3 | #10 | #9 | #55 | #77 | #81 |
|---|---|---|---|---|---|---|
| Weight % | | | | | | |
| SiO2 | 68 | 66.5 | 65 | 59 | 57.5 | 56 |
| Al2O3 | 18.75 | 20.25 | 21.75 | 27.75 | 29.25 | 30.75 |
| CaO | 13.25 | 13.25 | 13.25 | 13.25 | 13.25 | 13.25 |
| Total | 100 | 100 | 100 | 100 | 100 | 100 |
| Mol % | | | | | | |
| SiO2 | 72.92 | 71.79 | 70.64 | 65.88 | 64.65 | 63.41 |
| Al2O3 | 11.85 | 12.88 | 13.93 | 18.26 | 19.38 | 20.52 |
| CaO | 15.23 | 15.33 | 15.43 | 15.85 | 15.96 | 16.08 |
| Total | 100 | 100 | 100 | 100 | 100 | 100 |
| Mole % RO | 15.23 | 15.33 | 15.43 | 15.85 | 15.96 | 16.08 |
| Log 3.0 (° F.) | 2791 | 2765 | 2734 | 2658 | | |
| Liquidus (° F.) | 2527 | 2571 | 2609 | 2641 | 2727 | 2715 |
| Delta-T (F.) | 265 | 194 | 125 | 17 | | |
| Tg (° C.) | 859 | 861 | 859 | 858 | 868 | 867 |

Both S-glass and glass #9 were fiberized in a single hole laboratory bushing. The monofilament fiber was wound on a collect to produce about 10 g of fiber. The fiber was cut to produce a "hank" of fibers. Both glass compositions were tested separately in a temperature gradient furnace for 4 hours to determine the temperature at which sintering began. Sintering is defined as the point at which the viscosity becomes low enough for fibers to join together. This is roughly the same point at which the fiber-pack would collapse under its own weight in a high temperature environment such as an automotive exhaust system. The results of the lab mimic showed that S-glass sinters 30 K lower than glass #9. Glass #9 out performed S-glass by about 30 K for the 4-hour test. It was determined that $T_g$ needed to be between 850 and 860° C. in order to operate at temperatures similar to S-glass. Reducing log 3.0 and increasing delta-T were necessary to reduce the manufacturing cost.

Glass #9 was used as the base glass since it out performed S-glass and had a superior delta-T. To lower the viscosity, $Al_2O_3$ was substituted for $SiO_2$ on a weight percent basis. Although this substitution did not adversely affect $T_g$, the liquidus was increased to the point where the delta-T was not acceptable (see glasses #55, #77, and #81). In order to reduce the liquidus, other alkaline earths such as MgO, SrO, and BaO were substituted for CaO.

The mole % percent substitution of MgO for CaO has a significant impact on reducing the liquidus, but also reduces $T_g$. The log 3.0 is largely unaffected although it was not extensively measured. This can be seen in Tables 3 and 4.

TABLE 3

|  | #55 | #68 | #75 | #76 |
|---|---|---|---|---|
| Wt % | | | | |
| SiO2 | 59 | 59.28 | 59.56 | 59.85 |
| Al2O3 | 27.75 | 27.88 | 28.01 | 28.15 |
| CaO | 13.25 | 11.63 | 10.00 | 8.35 |
| MgO | | 1.21 | 2.43 | 3.66 |
| Total | 100 | 100 | 100 | 100 |

TABLE 3-continued

|  | #55 | #68 | #75 | #76 |
|---|---|---|---|---|
| Mol % | | | | |
| SiO2 | 65.88 | 65.88 | 65.89 | 65.89 |
| Al2O3 | 18.26 | 18.26 | 18.26 | 18.26 |
| CaO | 15.85 | 13.85 | 11.85 | 9.85 |
| MgO | 0 | 2.00 | 4.00 | 6.00 |
| Total | 100 | 100 | 100 | 100 |
| Mole % RO | 15.85 | 15.85 | 15.85 | 15.85 |
| Log 3.0 (° F.) | 2658 | | | |
| Liquidus (° F.) | 2641 | 2608 | 2669 | 2680 |
| Delta-T (F.) | 17 | | | |
| Tg (° C.) | 858 | 856 | 835 | 828 |

TABLE 4

|  | #6 | #11 | #12 | #13 | #14 | #15 |
|---|---|---|---|---|---|---|
| Wt % | | | | | | |
| SiO2 | 63.50 | 63.67 | 63.83 | 64.16 | 64.50 | 64.83 |
| Al2O3 | 20.81 | 20.86 | 20.92 | 21.03 | 21.14 | 21.25 |
| CaO | 15.69 | 14.91 | 14.12 | 12.55 | 10.98 | 9.41 |
| MgO | | 0.56 | 1.13 | 2.26 | 3.38 | 4.51 |
| Total | 100 | 100 | 100 | 100 | 100 | 100 |
| Mol % | | | | | | |
| SiO2 | 68.59 | 68.62 | 68.66 | 68.72 | 68.79 | 68.85 |
| Al2O3 | 13.25 | 13.25 | 13.26 | 13.27 | 13.29 | 13.30 |
| CaO | 18.16 | 17.22 | 16.27 | 14.40 | 12.55 | 10.71 |
| MgO | 0 | 0.91 | 1.81 | 3.60 | 5.38 | 7.14 |
| Total | 100 | 100 | 100 | 100 | 100 | 100 |
| Mole % RO | 18.16 | 18.12 | 18.08 | 18.01 | 17.93 | 17.85 |
| Log 3.0 (° F.) | 2669 | 2680 | 2677 | 2671 | 2682 | 2684 |
| Liquidus (° F.) | 2580 | 2601 | 2563 | 2531 | 2483 | 2407 |
| Delta T (° F.) | 89 | 79 | 114 | 140 | 199 | 277 |

The weight % substitution of SrO for CaO has a small impact on reducing the liquidus and raises $T_g$ slightly.

TABLE 5

|  | #54 | #67 | #58 | #57 | #56 |
|---|---|---|---|---|---|
| Wt % | | | | | |
| SiO2 | 59 | 58.17 | 59 | 59 | 59 |
| Al2O3 | 27.75 | 27.36 | 25.31 | 25.31 | 25.31 |
| CaO | 11.93 | 10.11 | 15.69 | 12.69 | 9.69 |
| MgO | 1.32 | 1.3 | | | |
| SrO | | 3.06 | | 3 | 6 |
| Total | 100 | 100 | 100 | 100 | 100 |
| Mol % | | | | | |
| SiO2 | 65.48 | 65.48 | 65.03 | 66.10 | 67.21 |
| Al2O3 | 18.15 | 18.15 | 16.44 | 16.71 | 16.99 |
| CaO | 14.19 | 12.19 | 18.53 | 15.23 | 11.83 |
| MgO | 2.18 | 2.18 | 0.00 | 0.00 | 0.00 |
| SrO | 0.00 | 2.00 | 0.00 | 1.95 | 3.96 |
| Total | 100 | 100 | 100 | 100 | 100 |
| Mole % RO | 16.37 | 14.38 | 18.53 | 15.23 | 11.83 |
| log 3.0 | 2644 | 2627 | 2601 | | |
| Liquidus | 2601 | 2571 | 2677 | 2651 | 2637 |
| Delta-T | 43 | 56 | −77 | | |
| Tg | 850 | 848 | 850 | 856 | 865 |

The mole % substitution of BaO for CaO has a large impact on reducing the liquidus. $T_g$ increases slightly and the log 3.0 increases significantly.

TABLE 6

|  | #55 | #94 | #95 | #96 |
|---|---|---|---|---|
| Wt % | | | | |
| SiO2 | 59 | 57.34 | 55.77 | 54.28 |
| Al2O3 | 27.75 | 26.97 | 26.23 | 25.53 |
| CaO | 13.25 | 11.25 | 9.36 | 7.57 |
| BaO | 0 | 4.44 | 8.64 | 12.62 |
| Total | 100 | 100 | 100 | 100 |
| Mol % | | | | |
| SiO2 | 65.88 | 65.89 | 65.89 | 65.89 |
| Al2O3 | 18.26 | 18.26 | 18.26 | 18.26 |
| CaO | 15.85 | 13.85 | 11.85 | 9.85 |
| BaO | 0.00 | 2.00 | 4.00 | 6.00 |
| Total | 100 | 100 | 100 | 100 |
| Mole % RO | 15.85 | 15.85 | 15.85 | 15.85 |
| log 3.0 | 2658 |  | 2696 | 2691 |
| Liquidus | 2641 | 2641 | 2581 | 2541 |
| Delta-T | 17 |  | 115 | 150 |
| Tg | 858 | 875 | 873 | 874 |

Therefore the goal is to find the right mix of alkaline earth oxides to meet the target properties of the glass. Zirconia (ZrO$_2$) can be added in small percentages to decrease the log 3.0 but at the same time increase T$_g$. The liquidus is also decreased with small additions of ZrO$_2$.

TABLE 7

|  | #100 | #108 | #109 | #110 |
|---|---|---|---|---|
| Wt % | | | | |
| SiO2 | 53.22 | 52.69 | 52.16 | 51.62 |
| Al2O3 | 24.26 | 24.02 | 23.77 | 23.53 |
| CaO | 9.75 | 9.65 | 9.56 | 9.46 |
| ZrO2 |  | 1.00 | 2.00 | 3.00 |
| BaO | 12.77 | 12.64 | 12.51 | 12.39 |
| Total | 100 | 100 | 100 | 100 |
| Mol % | | | | |
| SiO2 | 64.14 | 63.77 | 63.38 | 63.00 |
| Al2O3 | 17.23 | 17.13 | 17.03 | 16.92 |
| CaO | 12.59 | 12.52 | 12.44 | 12.37 |
| ZrO2 | 0.00 | 0.59 | 1.19 | 1.79 |
| BaO | 6.03 | 6.00 | 5.96 | 5.92 |
| Total | 100 | 100 | 100 | 100 |
| Mole % RO | 18.62 | 18.51 | 18.40 | 18.29 |
| log 3.0 | 2629 |  |  | 2605 |
| Liquidus | 2569 | 2624 | 2557 | 2552 |
| Delta-T | 60 |  |  | 53 |
| Tg | 857 | 859 | 860 | 863 |

As is understood in the art, the above exemplary compositions do not always total precisely 100% of the listed components due to statistical conventions (e.g., rounding and averaging). Of course, the actual amounts of all components, including any impurities, in a specific composition always total to 100%. Furthermore, it should be understood that where small quantities of components are specified in the compositions, e.g., quantities on the order of about 0.05 weight percent or less, those components may be present in the form of trace impurities present in the raw materials, rather than intentionally added. Moreover, components may be added to the batch composition, e.g., to facilitate processing, that are later eliminated, resulting in a glass composition that is essentially free of such components. Thus, for instance, although minute quantities of components such as fluorine and sulfate have been listed in various examples, the resulting glass composition may be essentially free of such components—e.g. they may be merely trace impurities in the raw materials for the silica, calcium oxide, alumina, and magnesia components in commercial practice of the invention or they may be processing aids that are essentially removed during manufacture. As apparent from the above examples, glass fiber compositions of the invention have advantageous properties, such as low forming viscosities and wide (high) delta-T values. Other advantages and obvious modifications of the invention will be apparent to the artisan from the above description and further through practice of the invention.

The addition of alkali metal oxides, such as Li$_2$O, Na$_2$O, and K$_2$O are known to have a strong impact on reducing the glass transition temperature. Therefore additions of R$_2$O should be kept to a minimum. Table #8 illustrates the effect of Na$_2$O additions to Advantex® glass.

TABLE 8

Effect of Soda Addition on Tg of Advantex ® Glass

| Wt. % Na2O | Tg (° C.) |
|---|---|
| 0 | 756 |
| 0.65 | 737 |
| 1.25 | 725 |

Glasses #96 and #110 were tested against S-glass by isothermally heat treating fiber bundles for 8 hours at different temperatures. The fiber bundles were mounted in epoxy after heat treatment and the cross-sections were polished. The polished cross-sections of the fiber bundles were analyzed using a scanning electron microscope (SEM) in backscatter mode to determine the extent of fiber coalescence.

TABLE 9

Amount of Fiber Sintering After
8 Hour Heat Treatments of Fiber Bundles

|  | S-Glass | Glass #110 | Glass #96 |
|---|---|---|---|
| 880° C. | none | none | none |
| 903° C. | significant | none | none |
| 921° C. | extensive | significant | none |

SEM micrographs are presented in FIGS. 1–4 to illustrate the coalescence described in Table #9. From the micrographs presented in FIGS. 1–4, it is evident that both glass #96 and #110 outperform S-glass. S-glass had significant sintering occur at 903° C. and extensive fiber coalescence at 921° C.

TABLE 10

SUMMARY OF GLASS DATA

| | #50 | #6 | #7 | #8 | #9 | #10 | #3 | #2 | #21 | #22 | #23 | #24 |
|---|---|---|---|---|---|---|---|---|---|---|---|---|
| Weight % | | | | | | | | | | | | |
| $SiO_2$ | 59 | 63.5 | 65 | 66.5 | 65 | 66.5 | 68 | 65 | 63.70 | 62.40 | 61.10 | 64.68 |
| $Al_2O_3$ | 27.75 | 20.81 | 19.31 | 17.81 | 21.75 | 20.25 | 18.75 | 16.875 | 16.54 | 16.20 | 15.86 | 16.79 |
| CaO | 7.25 | 15.69 | 15.69 | 15.69 | 13.25 | 13.25 | 13.25 | 18.125 | 17.76 | 17.40 | 17.04 | 18.03 |
| MgO | 3 | | | | | | | | | | | |
| SrO | | | | | | | | | | | | |
| BaO | 3 | | | | | | | | | | | |
| $ZrO_2$ | | | | | | | | | 2.00 | 4.00 | 6.00 | |
| $Na_2O$ | | | | | | | | | | | | 0.50 |
| Total | 100 | 100 | 100 | 100 | 100 | 100 | 100 | 100 | 100 | 100 | 100 | 100 |
| Mol % | | | | | | | | | | | | |
| $SiO_2$ | 66.04 | 68.59 | 69.75 | 70.89 | 70.64 | 71.79 | 72.92 | 68.88 | 68.16 | 67.43 | 66.68 | 68.53 |
| $Al_2O_3$ | 18.31 | 13.25 | 12.21 | 11.19 | 13.93 | 12.88 | 11.85 | 10.54 | 10.43 | 10.32 | 10.20 | 10.48 |
| CaO | 8.70 | 18.16 | 18.04 | 17.92 | 15.43 | 15.33 | 15.23 | 20.58 | 20.37 | 20.15 | 19.92 | 20.47 |
| MgO | 5.01 | | | | | | | | | | | |
| SrO | 1.95 | | | | | | | | | | | |
| BaO | | | | | | | | | | | | |
| $ZrO_2$ | | | | | | | | | 1.04 | 2.11 | 3.19 | |
| $Na_2O$ | | | | | | | | | | | | 0.51 |
| Total | 100 | 100 | 100 | 100 | 100 | 100 | 100 | 100 | 100 | 100 | 100 | 100 |
| Total Moles | 1.49 | 1.54 | 1.55 | 1.56 | 1.53 | 1.54 | 1.55 | 1.57 | 1.56 | 1.54 | 1.52 | 1.57 |
| Mole % RO | 15.65 | 18.16 | 18.04 | 17.92 | 15.43 | 15.33 | 15.23 | 20.58 | 20.37 | 20.15 | 19.92 | 20.47 |
| log 3.0 | | 2669 | 2694 | 2722 | 2734 | 2765 | 2791 | 2586 | 2599 | 2570 | 2562 | 2601 |
| Liquidus | 2697 | 2580 | 2537 | 2471 | 2609 | 2571 | 2527 | 2397 | 2438 | 2548 | >2750 | 2392 |
| Delta-T | | 89 | 157 | 251 | 125 | 194 | 265 | 189 | 161 | 22 | | 209 |
| Tg | 835 | 838 | 836 | 837 | 859 | 861 | 859 | 806 | 828 | 830 | 840 | |

| | #25 | #51 | #52 | #53 | #54 | #55 | #75 | #76 | #77 | #78 | #79 | #80 |
|---|---|---|---|---|---|---|---|---|---|---|---|---|
| Weight % | | | | | | | | | | | | |
| $SiO_2$ | 64.35 | 59 | 59 | 59 | 59 | 59 | 59.56 | 59.85 | 57.5 | 57.77 | 58.05 | 58.32 |
| $Al_2O_3$ | 16.71 | 27.75 | 27.75 | 27.75 | 27.75 | 27.75 | 28.01 | 28.15 | 29.25 | 29.39 | 29.52 | 29.66 |
| CaO | 17.94 | 9.25 | 11.25 | 10.6 | 11.93 | 13.25 | 10.00 | 8.35 | 13.25 | 11.64 | 10.02 | 8.39 |
| MgO | | | | 2.65 | 1.32 | | 2.43 | 3.66 | | 1.20 | 2.41 | 3.63 |
| SrO | | 4 | 2 | | | | | | | | | |
| BaO | | | | | | | | | | | | |
| $ZrO_2$ | | | | | | | | | | | | |
| $Na_2O$ | 1.00 | | | | | | | | | | | |
| Total | 100 | 100 | 100 | 100 | 100 | 100 | 100 | 100 | 100 | 100 | 100 | 100 |
| Mol % | | | | | | | | | | | | |
| $SiO_2$ | 68.17 | 67.36 | 66.61 | 65.08 | 65.48 | 65.88 | 65.89 | 65.89 | 64.65 | 64.66 | 64.66 | 64.65 |
| $Al_2O_3$ | 10.43 | 18.67 | 18.47 | 18.04 | 18.15 | 18.26 | 18.26 | 18.26 | 19.38 | 19.38 | 19.38 | 19.38 |
| CaO | 20.37 | 11.32 | 13.61 | 12.53 | 14.19 | 15.85 | 11.85 | 9.85 | 15.96 | 13.96 | 11.96 | 9.97 |
| MgO | | | | 4.36 | 2.18 | | 4.00 | 6.00 | | 2.00 | 4.00 | 6.00 |
| SrO | | 2.65 | 1.31 | | | | | | | | | |
| BaO | | | | | | | | | | | | |
| $ZrO_2$ | | | | | | | | | | | | |
| $Na_2O$ | 1.03 | | | | | | | | | | | |
| Total | 100 | 100 | 100 | 100 | 100 | 100 | 100 | 100 | 100 | 100 | 100 | 100 |
| Total Moles | 1.57 | 1.46 | 1.47 | 1.51 | 1.50 | 1.49 | 1.50 | 1.51 | 1.48 | 1.49 | 1.49 | 1.50 |
| Mole % RO | 20.37 | 13.96 | 14.92 | 16.88 | 16.37 | 15.85 | 15.85 | 15.85 | 15.96 | 15.96 | 15.96 | 15.97 |
| log 3.0 | 2586 | | | | 2644 | 2658 | | | | | | |
| Liquidus | 2351 | 2741 | 2611 | 2604 | 2601 | 2641 | 2669 | 2680 | 2727 | 2706 | 2737 | 2694 |
| Delta-T | 235 | | | | 43 | 17 | | | | | | |
| Tg | | 868 | 863 | 838 | 850 | 858 | 835 | 828 | 868 | 851 | 840 | 833 |

| | #81 | #82 | #83 | #84 | #85 | #86 | #87 | #88 | #89 | #90 | #67 | #68 |
|---|---|---|---|---|---|---|---|---|---|---|---|---|
| Weight % | | | | | | | | | | | | |
| $SiO_2$ | 56 | 56.26 | 56.52 | 56.79 | 58.59 | 58.18 | 57.38 | 56.59 | 57.64 | 56.85 | 58.17 | 59.28 |
| $Al_2O_3$ | 30.75 | 30.89 | 31.04 | 31.18 | 27.55 | 27.36 | 26.98 | 26.62 | 27.11 | 26.74 | 27.36 | 27.88 |

TABLE 10-continued

SUMMARY OF GLASS DATA

| | | | | | | | | | | | | |
|---|---|---|---|---|---|---|---|---|---|---|---|---|
| CaO | 13.25 | 11.66 | 10.05 | 8.42 | 12.33 | 11.41 | 9.63 | 7.90 | 8.04 | 6.32 | 10.11 | 11.63 |
| MgO | | 1.19 | 2.39 | 3.60 | | | | | 1.17 | 1.16 | 1.3 | 1.21 |
| SrO | | | | | 1.53 | 3.05 | 6.01 | 8.89 | 6.04 | 8.93 | 3.06 | |
| BaO | | | | | | | | | | | | |
| ZrO2 | | | | | | | | | | | | |
| Na2O | | | | | | | | | | | | |
| Total Mol % | 100 | 100 | 100 | 100 | 100 | 100 | 100 | 100 | 100 | 100 | 100 | 100 |
| SiO2 | 63.41 | 63.40 | 63.40 | 63.40 | 65.89 | 65.89 | 65.89 | 65.88 | 65.89 | 65.88 | 65.48 | 65.88 |
| Al2O3 | 20.52 | 20.52 | 20.52 | 20.52 | 18.26 | 18.26 | 18.26 | 18.26 | 18.26 | 18.26 | 18.15 | 18.26 |
| CaO | 16.08 | 14.08 | 12.08 | 10.08 | 14.86 | 13.85 | 11.85 | 9.85 | 9.85 | 7.85 | 12.19 | 13.85 |
| MgO | | 2.00 | 4.00 | 6.00 | | | | | 1.99 | 2.00 | 2.18 | 2.00 |
| SrO | | | | | 1.00 | 2.00 | 4.00 | 6.00 | 4.00 | 6.00 | 2.00 | |
| BaO | | | | | | | | | | | | |
| ZrO2 | | | | | | | | | | | | |
| Na2O | | | | | | | | | | | | |
| Total | 100 | 100 | 100 | 100 | 100 | 100 | 100 | 100 | 100 | 100 | 100 | 100 |
| Total Moles | 1.47 | 1.48 | 1.48 | 1.49 | 1.48 | 1.47 | 1.45 | 1.43 | 1.46 | 1.44 | 1.48 | 1.50 |
| Mole % RO | 16.08 | 16.08 | 16.08 | 16.08 | 15.85 | 15.85 | 15.85 | 15.86 | 15.85 | 15.85 | 16.37 | 15.85 |
| log 3.0 | | | | | | | | | | | 2627 | |
| Liquidus | 2715 | 2771 | 2683 | | 2687 | 2678 | 2643 | 2659 | 2604 | 2587 | 2571 | 2608 |
| Delta-T | | | | | | | | | | | 56 | |
| Tg | 867 | 859 | 844 | 831 | 865 | 870 | 860 | 872 | 848 | 860 | 848 | 856 |

| | #69 | #70 | #56 | #57 | #55 | #94 | #95 | #96 | #58 | #97 | #99 | #98 |
|---|---|---|---|---|---|---|---|---|---|---|---|---|
| Weight % | | | | | | | | | | | | |
| SiO2 | 55.99 | 59.28 | 59 | 59 | 59 | 57.34 | 55.77 | 54.28 | 59 | 58.51 | 52.11 | 54.22 |
| Al2O3 | 24.02 | 25.43 | 25.31 | 25.31 | 27.75 | 26.97 | 26.23 | 25.53 | 25.31 | 24.24 | 22.35 | 23.26 |
| CaO | 8.86 | 8.09 | 9.69 | 12.69 | 13.25 | 11.25 | 9.36 | 7.57 | 15.69 | 12.6 | 7.13 | 9.75 |
| MgO | | 1.18 | | | | | | | | | | |
| SrO | 11.13 | 6.02 | 6 | 3 | | | | | | | | |
| BaO | | | | | | 4.44 | 8.64 | 12.62 | | 6.65 | 18.41 | 12.77 |
| ZrO2 | | | | | | | | | | | | |
| Na2O | | | | | | | | | | | | |
| Total Mol % | 100 | 100 | 100 | 100 | 100 | 100 | 100 | 100 | 100 | 100 | 100 | 100 |
| SiO2 | 65.03 | 67.22 | 67.21 | 66.10 | 65.88 | 65.89 | 65.89 | 65.89 | 65.03 | 65.03 | 65.03 | 65.03 |
| Al2O3 | 16.44 | 16.99 | 16.99 | 16.71 | 18.26 | 18.26 | 18.26 | 18.26 | 16.44 | 16.44 | 16.44 | 16.44 |
| CaO | 11.03 | 9.83 | 11.83 | 15.23 | 15.85 | 13.85 | 11.85 | 9.85 | 18.53 | 15.54 | 9.53 | 12.53 |
| MgO | | 1.99 | | | | | | | | | | |
| SrO | 7.50 | 3.96 | 3.96 | 1.95 | | | | | | | | |
| BaO | | | | | | 2.00 | 4.00 | 6.00 | | 3.00 | 9.00 | 6.00 |
| ZrO2 | | | | | | | | | | | | |
| Na2O | | | | | | | | | | | | |
| Total | 100 | 100 | 100 | 100 | 100 | 100 | 100 | 100 | 100 | 100 | 100 | 100 |
| Total Moles | 1.43 | 1.47 | 1.46 | 1.49 | 1.49 | 1.45 | 1.41 | 1.37 | 1.51 | 1.45 | 1.33 | 1.39 |
| Mole % RO | 18.52 | 15.78 | 15.79 | 17.18 | 15.85 | 15.85 | 15.85 | 15.85 | 18.53 | 18.53 | 18.54 | 18.53 |
| log 3.0 | | 2649 | | | 2658 | | 2696 | 2691 | 2601 | | | 2669 |
| Liquidus | 2701 | 2561 | 2637 | 2651 | 2641 | 2641 | 2581 | 2541 | 2677 | 2651 | 2627 | 2563 |
| Delta-T | | 88 | | | 17 | | 115 | 150 | −76 | | | 106 |
| Tg | 849 | 847 | 865 | 856 | 858 | 875 | 873 | 874 | 850 | 854 | 855 | 858 |

| | #100 | #101 | #96 | #102 | #103 | #104 | #102 | #105 | #106 | #107 | #100 | #108 |
|---|---|---|---|---|---|---|---|---|---|---|---|---|
| Weight % | | | | | | | | | | | | |
| SiO2 | 53.22 | 52.22 | 54.28 | 52.78 | 51.28 | 49.78 | 52.78 | 52.25 | 51.72 | 51.20 | 53.22 | 52.69 |
| Al2O3 | 24.26 | 25.26 | 25.53 | 27.03 | 28.53 | 30.03 | 27.03 | 26.76 | 26.49 | 26.22 | 24.26 | 24.02 |
| CaO | 9.75 | 9.75 | 7.57 | 7.57 | 7.57 | 7.57 | 7.57 | 7.49 | 7.42 | 7.34 | 9.75 | 9.65 |
| MgO | | | | | | | | | | | | |
| SrO | | | | | | | | | | | | |

TABLE 10-continued

SUMMARY OF GLASS DATA

| | | | | | | | | | | | | |
|---|---|---|---|---|---|---|---|---|---|---|---|---|
| BaO | 12.77 | 12.77 | 12.62 | 12.62 | 12.62 | 12.62 | 12.62 | 12.49 | 12.37 | 12.24 | 12.77 | 12.64 |
| ZrO2 | | | | | | | | 1.00 | 2.00 | 3.00 | | 1.00 |
| Na2O | | | | | | | | | | | | |
| Total Mol % | 100 | 100 | 100 | 100 | 100 | 100 | 100 | 100 | 100 | 100 | 100 | 100 |
| SiO2 | 64.14 | 63.25 | 65.89 | 64.55 | 63.19 | 61.81 | 64.55 | 64.16 | 63.77 | 63.38 | 64.14 | 63.77 |
| Al2O3 | 17.23 | 18.03 | 18.26 | 19.48 | 20.72 | 21.98 | 19.48 | 19.37 | 19.25 | 19.13 | 17.23 | 17.13 |
| CaO | 12.59 | 12.65 | 9.85 | 9.92 | 10.00 | 10.07 | 9.92 | 9.86 | 9.80 | 9.74 | 12.59 | 12.52 |
| MgO | | | | | | | | | | | | |
| SrO | | | | | | | | | | | | |
| BaO | 6.03 | 6.06 | 6.00 | 6.05 | 6.09 | 6.14 | 6.05 | 6.01 | 5.98 | 5.94 | 6.03 | 6.00 |
| ZrO2 | | | | | | | | 0.60 | 1.20 | 1.81 | | 0.59 |
| Na2O | | | | | | | | | | | | |
| Total | 100 | 100 | 100 | 100 | 100 | 100 | 100 | 100 | 100 | 100 | 100 | 100 |
| Total Moles | 1.38 | 1.37 | 1.37 | 1.36 | 1.35 | 1.34 | 1.36 | 1.36 | 1.35 | 1.34 | 1.38 | 1.38 |
| Mole % RO | 18.62 | 18.72 | 15.85 | 15.97 | 16.09 | 16.21 | 15.97 | 15.87 | 15.78 | 15.68 | 18.62 | 18.51 |
| log 3.0 | 2629 | 2628 | 2691 | 2647 | | | 2647 | | | 2614 | 2629 | |
| Liquidus | 2569 | 2609 | 2541 | 2640 | >2650 | 2807 | 2640 | 2691 | 2659 | 2617 | 2569 | 2624 |
| Delta-T | 60 | 19 | 150 | 7 | | | 7 | | | | 60 | |
| Tg | 857 | 856 | 874 | 865 | 870 | 874 | 865 | | | 865 | 857 | 859 |

| | #109 | #110 |
|---|---|---|
| Weight % | | |
| SiO2 | 52.16 | 51.62 |
| Al2O3 | 23.77 | 23.53 |
| CaO | 9.56 | 9.46 |
| MgO | | |
| SrO | | |
| BaO | 12.51 | 12.39 |
| ZrO2 | 2.00 | 3.00 |
| Na2O | | |
| Total Mol % | 100 | 100 |
| SiO2 | 63.38 | 63.00 |
| Al2O3 | 17.03 | 16.92 |
| CaO | 12.44 | 12.37 |
| MgO | | |
| SrO | | |
| BaO | 5.96 | 5.92 |
| ZrO2 | 1.19 | 1.79 |
| Na2O | | |
| Total | 100 | 100 |
| Total Moles | 1.37 | 1.36 |
| Mole % RO | 18.40 | 18.29 |
| log 3.0 | | 2605 |
| Liquidus | 2557 | 2552 |
| Delta-T | | 53 |
| Tg | 860 | 863 |

What is claimed is:

1. A continuous glass fiber produced from a composition consisting essentially of:
   60–72 mole percent $SiO_2$,
   10–20 mole percent $Al_2O_3$,
   14.0 to 22.0 mole percent RO, where RO equals the sum of MgO, CaO, SrO and BaO mole percents, wherein the amount of MgO is less than 3 mole percent,
   0 to 5 mole percent $ZrO_2$, and
   0 to 3 mole percent alkaline metal oxide,
   wherein the composition has
   (i) a glass transition temperature of at least 1472° F. (800° C.),
   (ii) a viscosity of about 1000 poise at a forming temperature greater than 2500° F. (1371° C.),
   (iii) a liquidus temperature at least 50° F. (28° C.) below the forming temperature, and
   (iv) a glass transition temperature greater than 1517° F. (825° C.).

2. A continuous glass fiber according to claim 1, further consisting essentially of not more than about 4 mole percent of at least one oxide or halogen selected from the group consisting of ZnO, $SO_2$, $F_2$, $B_2O_3$, $TiO_2$ and $Fe_2O_3$.

3. A continuous glass fiber according to claim 1 wherein the glass transition temperature is at least 828° C.

4. A continuous glass fiber according to claim 1 wherein the glass transition temperature is at least 850° C.

5. A continuous glass fiber according to claim 1 wherein the glass transition temperature is at least 870° C.

6. A continuous glass fiber produced from a composition consisting essentially of:

61–68 mole percent $SiO_2$,

15–9 mole percent $Al_2O_3$,

15–20 mole percent RO where RO equals the sum of MgO, CaO, SrO and BaO, wherein the amount of MgO is less than 2.5 mole percent.

less than 3 mole percent $ZrO_2$, and less than 2 mole percent alkali metal oxide;

wherein the composition has (i) a viscosity of 1000 poise at a forming temperature greater than 2500° F. (1371° C.), (ii) a liquidus temperature at least 50° F. (28° C.) below the forming temperature, and (iii) a glass transition temperature greater than 1517° F. (825° C.).

7. A continuous glass fiber according to claim 6, further consisting essentially of not more than about 4 mole percent of at least one oxide or halogen selected from the group consisting of ZnO, $SO_2$, $F_2$, $B_2O_3$, TiO2 and $Fe_2O_3$.

8. A continuous glass fiber produced from a composition consisting essentially of:

61–68 mole percent $SiO_2$,

15–19 mole percent $Al_2O_3$,

15–20 mole percent RO, wherein RO is equal to the sum of CaO and BaO, less than about 3 mole percent $ZiO_2$, and less than about 2 mole percent alkali metal oxide, wherein the composition has (i) a viscosity of 1000 poise at a forming temperature of at least 2500° F. (1371° C.), (ii) a liquidus temperature at least 50° F. (28° C.) below the forming temperature and (iii) a glass transition temperature greater than 1544° F. (840° C.).

9. A continuous glass fiber according to claim 8, further consisting essentially of not more than 4 mole percent of at least one oxide or halogen selected from the group consisting of ZnO, $SO_2$, $F_2$, $B_2O_3$, $TiO_2$ and $Fe_2O_3$.

* * * * *